United States Patent
Kneer et al.

(10) Patent No.: US 9,868,317 B2
(45) Date of Patent: Jan. 16, 2018

(54) APPARATUS AND METHOD FOR INSERTING A CIRCULAR-BLANK CORE INTO A CIRCULAR-BLANK RING

(71) Applicant: Schuler Pressen GMBH, Göppingen (DE)

(72) Inventors: Simon Kneer, Kuchen (DE); Wolfgang Hoyler, Donzdorf (DE); Gerhard Hartl, Göppingen (DE)

(73) Assignee: SCHULER PRESSEN GMBH, Göppingen (DE)

( * ) Notice: Subject to any disclaimer, the term of this patent is extended or adjusted under 35 U.S.C. 154(b) by 183 days.

(21) Appl. No.: 14/899,380

(22) PCT Filed: Jun. 17, 2014

(86) PCT No.: PCT/EP2014/062638
§ 371 (c)(1),
(2) Date: Dec. 17, 2015

(87) PCT Pub. No.: WO2014/202562
PCT Pub. Date: Dec. 24, 2014

(65) Prior Publication Data
US 2016/0129725 A1    May 12, 2016

(30) Foreign Application Priority Data
Jun. 19, 2013 (DE) .................. 10 2013 106 375

(51) Int. Cl.
*B44B 5/02* (2006.01)
*B44B 5/00* (2006.01)
*B23P 19/04* (2006.01)

(52) U.S. Cl.
CPC .............. *B44B 5/024* (2013.01); *B23P 19/04* (2013.01); *B44B 5/0057* (2013.01)

(58) Field of Classification Search
CPC ......... B44B 5/024; B44B 5/0057; B23P 19/04
See application file for complete search history.

(56) References Cited

FOREIGN PATENT DOCUMENTS

| DE | 3339387 A1 | 5/1984 |
|----|------------|--------|
| DE | 19841622 A1 | 3/2000 |

(Continued)

OTHER PUBLICATIONS

International Search Report for corresponding International Application No. PCT/EP2014/062638, dated Sep. 3, 2014, 6 pages.

*Primary Examiner* — Ryan J Walters
(74) *Attorney, Agent, or Firm* — Fitch, Even, Tabin & Flannery LLP (57) ABSTRACT

An apparatus and a method for inserting a non-round circular-blank core into a non-round hole of a circular-blank ring to create a circular blank. A transporting device transports the circular-blank ring to an insertion location. A feed device transports the circular-blank core to the insertion location. The circular-blank core is positioned on the hole of the circular-blank ring and inserted into the hole with the aid of a pushing-in device, which applies a pushing-in force. If the non-round hole is not in alignment with the non-round circular-blank core, the circular-blank core and the circular-blank ring are rotated relative to one another at the insertion location by generation of the pushing-in force. The circular-blank ring is preferably moved, by the pushing-in force, onto an alignment mandrel, which causes the circular-blank ring to rotate in its circumferential direction until the contours of the circular-blank core and of the hole are in alignment.

13 Claims, 6 Drawing Sheets

(56) References Cited

FOREIGN PATENT DOCUMENTS

| | | |
|---|---|---|
| DE | 10057000 A1 | 5/2001 |
| DE | 10044669 A1 | 4/2002 |
| EP | 0648618 A1 | 4/1995 |

APPARATUS AND METHOD FOR INSERTING A CIRCULAR-BLANK CORE INTO A CIRCULAR-BLANK RING

CROSS REFERENCE TO RELATED APPLICATIONS

This patent application is the national phase of PCT/EP2014/062638 filed Jun. 17, 2014, which claims the benefit of German Patent Application No. 10 2013 106 375.6 filed Jun. 19, 2013.

TECHNICAL FIELD

The present invention relates to an apparatus and a method for inserting a round blank core having a non-round outside contour into a round blank ring having a hole with a non-round inside contour.

BACKGROUND

Such round blanks that consist of at least two-part or also three-part round blanks are used, for example, for stamping coins, medals or the like consisting of several metallic materials. In the case of three-part or also multi-part round blanks, a ring-shaped round blank core is inserted in the outermost round blank ring that, in turn, again represents a round blank ring relative to the round blank core that is to be inserted therein. The terms "round blank core" and "round blank ring" are meant to refer to the two adjoining round blank parts that are nested in each other.

The insertion of a round blank core in the round blank ring is easy if both the hole in the round blank ring and the outside contour of the round blank core are circular. However, if these contours deviate from the circular form, it is necessary, on the one hand, that the hole center and the round blank center be in substantial alignment and, on the other hand, that the insertion become possible at all. A twisting of one of the two round blank parts in circumferential direction, as well as a relative shifting of the two round blanks, can lead to disruptions of the embossing process and block feeding of the round blanks to the embossing press.

Publication DE 33 39 387 A1 discloses a device for feeding non-round blanks to the tool of an embossing press. During the transport of the blanks by means of a transport device said blanks slide along guide paths and thus orient themselves in circumferential direction. The insertion of circular cores into a non-circular ring is not described.

The feeding of round blank cores in circular holes of blanks is described, for example in publications DE 100 57 000 A1, DE 198 41 622 A1 or DE 100 44 669 A1. However, these do not contain any indication anywhere how non-round cores could be inserted in non-round holes.

SUMMARY

Therefore, the object of the present invention may be viewed to be an apparatus and a method for inserting a round blank core having a non-round outside contour into a hole of a round blank ring having a non-round inside contour.

In accordance with the invention there is provided a transporting device for transporting the round blank ring to an insertion location. At the insertion location, the round blank core is inserted in the round blank ring. A feed device is arranged in the region of the insertion location. The feed device is disposed to position the round blank core on the hole of the round blank ring. In doing so, the round blank core may be in direct contact with the round blank ring or be positioned so as to be adjacent to the hole at a minimal distance.

With the aid of a pushing-in device comprising a movable pushing-in part, a pushing-in force is applied to the round blank core. In doing so, a pushing-in force is applied to the round blank core in the direction of the round blank ring. If the round blank core and the round blank ring are correctly aligned in circumferential direction and in view of their position—so that the non-round outside contour of the round blank core matches the non-round inside contour of the hole—the round blank core is pressed into the round blank ring due to the pushing-in force and can subsequently be transported by the transporting device away from the insertion location, for example toward the embossing press.

In accordance with the invention the pushing-in device on the insertion location has an alignment means for the rotation of the round blank ring relative to the round blank core in circumferential direction of the round blank ring. With the aid of this alignment means, it is possible to move the round blank ring into a specified position of rotation, so that the round blank core can be inserted in the hole. Preferably, the alignment means is activated by the pushing-in force of the pushing-in device to perform the relative rotation. For the rotation of the round blank ring in its circumferential direction, the alignment means can come into contact in particular with the inside contour of the round blank ring. To accomplish this, the alignment means may comprise a one-part or multi-part alignment mandrel.

In a preferred exemplary embodiment, the alignment means may comprise a support ring with a support surface for the round blank ring, as well as an alignment mandrel having a non-round outside contour. The support ring can be moved in the direction of the pushing-in force. As long as the round blank core is in contact with the round blank ring, the round blank ring is moved together with the support ring due to the pushing-in force, and the round blank ring is slipped over the alignment mandrel. In doing so, the inside contour of the hole of the round blank ring comes into contact with several contact points on the alignment mandrel. As a result of this, the round blank ring aligns itself in its circumferential direction on the alignment mandrel. The position of rotation is specified by the position of the contact points on the non-round outside contour of the alignment mandrel. Consequently, the round blank ring assumes a nominal position of rotation. As soon as this position is reached, the pushing-in force effects the insertion of the round blank core in the round blank ring. Likewise, a relative position of the two round blank parts in a transverse direction and a longitudinal direction is thus achieved. In the transverse direction and the longitudinal direction, the two round blank parts can be shifted relative to each other during the transport. The position of the round blank ring in a plane covering the transverse and the longitudinal directions is specified via the alignment mandrel.

Preferably, the support ring is pretensioned in its non-loaded starting position by a pretensioning means. The pretensioning means has the effect that the round blank ring is pushed off the alignment mandrel after the round blank core is inserted into the hole of the round blank ring and/or after the pushing-in force is reduced.

Considering this advantageous embodiment, simple mechanical means can generate the pushing-in force and thus achieve a relative rotation of the round blank ring and/or a shifting motion in longitudinal direction and/or in transverse direction when the round blank ring is not in its specified position of rotation or its position in longitudinal direction and/or transverse direction relative to the round blank core.

In one exemplary embodiment the transporting device has a transport surface for the sliding transport of the round blank ring to the location of insertion. Such a transport can be implemented simply and rapidly so that high stroke rates can be achieved for embossing to be performed after the insertion of the round blank core in the round blank ring. The transporting device may have transport part that can be moved relative to the transport surface in order to accomplish transporting. Preferably, this transport part has a round blank recess for receiving the round blank ring. The round blank recess is open at least toward the transport surface and on the opposite side. As a result of this, the round blank rings can be inserted very easily in the round blank recesses from the side opposite the transport surface and be moved in a sliding manner over the transport surface. For example, the transporting device may have a plurality of transport parts that are supported so as to be rotatable about an axis of rotation.

In the starting position of the support ring the support surface of the support ring is preferably arranged in a common plane with the transport surface at the insertion location. The round blank rings can then be moved essentially continuously over the transport surface onto the support surface of the support ring.

The free end of the alignment mandrel is preferably located in or slightly below the plane in which the support surface of the support ring is arranged in the starting position of said ring. Consequently, an impairment of the movement of the round blank ring by the alignment mandrel is prevented.

In one embodiment, the contour of the shell surface of the alignment mandrel can be adapted to the outside contour of the round blank core or to the inside contour of the round blank ring. Alternatively, it is also possible to select the shell surface or the outside surface of the alignment mandrel to be different from the contours of the hole or the round blank core. For the clear alignment of the round blank ring in circumferential direction about its axis it is sufficient if the shell surface or outside surface of the alignment mandrel have three contact points or contact elements that are spaced apart in circumferential direction and that are associated with the inside contour of the hole of the round blank ring and come into contact with the round blank ring in order to impart the round blank ring with a relative rotation. For example, in cross-section, the alignment mandrel may have a polygon-like contour with three or more corner regions. Preferably, these corner regions have rounded and/or faceted and/or chamfered corners or edges. On its free end, the alignment mandrel may also have a bevel or another tapered form as the insertion chamfer.

In one advantageous exemplary embodiment, the feed device has a feed part that can be moved in a translatory manner. The feed part may have a core recess for receiving the round blank core. This core recess is preferably open on two opposite sides. The round blank core can thus be easily placed into the core recess from one side and, after the transport to the insertion location, the pushing-in force can be applied from one side to the round blank core, and the core can be pressed against and/or into the round blank ring on the respectively opposite side.

Preferably, the feed part can be moved in a feed device and can be supported, for example, so as to be movable in a translatory manner. The feed device intersects the transport direction of the round blank rings at the insertion location, said transport direction being specified by the transporting device.

In another preferred embodiment, the feed device comprises a feed means, for example a feed channel that continues to transport the round blank core to the the pushing-in part, whose movement continues to transport the round blank core to the round blank ring and subsequently acts on the round blank ring with the pushing-in force. As a result of this, the round blank core can be transported, for example, to a location below the round blank ring positioned at the insertion location, lifted up by means of the pushing-in part to the round blank ring and then be pressed against the round blank ring with the pushing-in force.

Advantageous embodiments of the apparatus as well as of the method can be inferred from the appended claims as well as from the description. The description is restricted to essential features of the invention. The drawings are to be used for additional reference. Hereinafter, the exemplary embodiments of the invention are described in detail with reference to the appended drawings.

DETAILED DESCRIPTION

Figure 1:
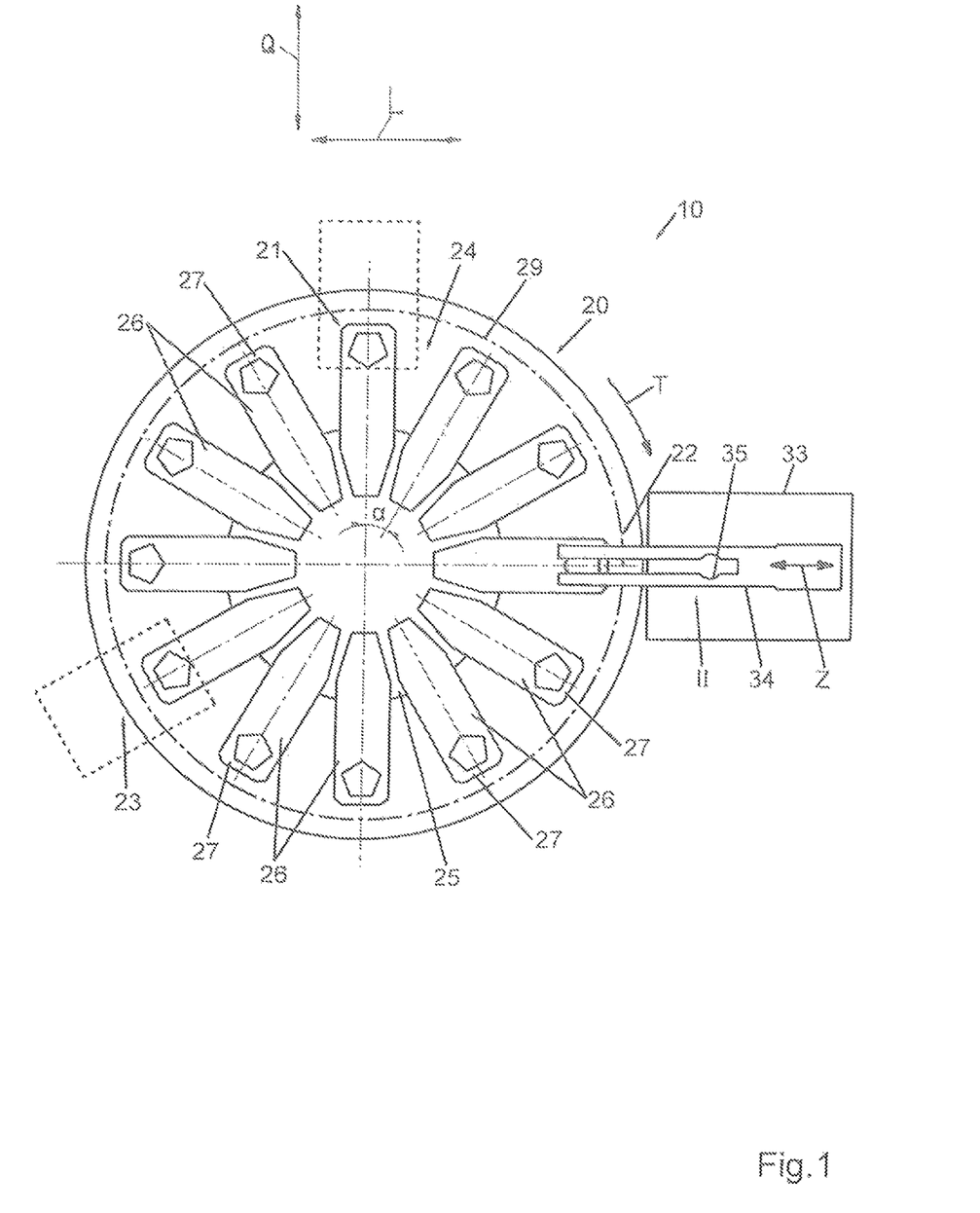
FIG. 1 a schematic block-diagram-like representation of an exemplary embodiment of the apparatus according to the present invention.

FIG. 1 shows a schematic representation of an apparatus 10. The apparatus is disposed for the insertion of a round blank core 11 having a non-round contour 12 into a round blank ring 13 having a center hole 14, wherein the hole 14 has a non-round inside contour 15. The inside contour 15 is adapted to the outside contour 12 so that the round blank core 11 can be inserted or pressed into the hole 14 of the round blank ring 13. The round blank core 11 and the round blank ring 13 are illustrated as examples in FIGS. 2 and 3. According to the example, the contours 12, 15 are shown in a so-called "corded edge form" with a convoluted edge extending in a circle. It is understood that it is also possible to use other non-round contours 12, 15, for example polygonal contours. As can be inferred from FIG. 2, the round blank ring 13 shown in the exemplary embodiment may also have a non-round outside contour, for example have the form of a polygon. In modification of the preferred embodiments, the outside contour of the round blank ring 13 could also be circular.

For the description of the invention, a round blank having two round blank parts 11, 13 is used as the example. However, the round blank core 13 in three-part or multi-part round blanks may also be configured in the form of a ring and thus represent an inner round blank ring relative to another round blank part that is to be inserted therein. The terms "round blank ring" and round blank core" are to be understood to mean directly adjacent and nested in each other round blank parts.

The apparatus 10 comprises a transporting device 20. The transporting device 20 is disposed to transport round blank rings from a receiving location 21, where the round blank rings 13 are to be transferred to the transporting device 20, to an insertion location 22. At the insertion location 22, one round blank core 22 is inserted in each of the round blank rings 13. In the exemplary embodiment of the apparatus 10, the transporting device 20 is further disposed to continue to transport the round blank ring 13 with the inserted round blank core 11 from the insertion location 22 to an output location 23. At the output location 23, the round blank consisting of the round blank ring 13 and the inserted round blank core 11 is output directly to an embossing press or to another transporting device. Alternatively, it is also possible to emboss the coins in an embossing station after insertion of the round blank core 11 in the round blank ring 13 and to subsequently output the completed, embossed coin at the output station 23.

In the exemplary embodiment described here, the transport of the round blank rings 13—with or without inserted round blank core 11 occurs in a sliding manner at or on a transport surface 24. In the exemplary embodiment the transport surface 24 is essentially configured so as to be essentially plane without steps, so that the round blank rings 13 can be moved in a sliding manner without becoming caught along the transport surface 24. "Essentially plane without steps" is to be understood to mean that bores or holes may be present in the transport surface, said bores or holes having diameters that are small relative to the diameter of the round blank 11, 13, so that the round blank can be moved in a sliding manner along the transport surface 24, without becoming wedged or jammed.

In the exemplary embodiment, the transporting device 20 performs the transport of the round blank rings 13 with or without inserted round blank core 11 in an orbit or an orbit section. Accordingly, the transport direction T extends in the direction of the orbit. To accomplish this, the transporting device comprises a turn table 25 that can be incrementally rotated forward by a drive by a respectively specified angle of rotation α. Several transport parts 29 are mounted to the turn table 25. The size of the angle of rotation α by which the turn table 25 is incrementally rotated defined by the number parts 26.

Figure 2:
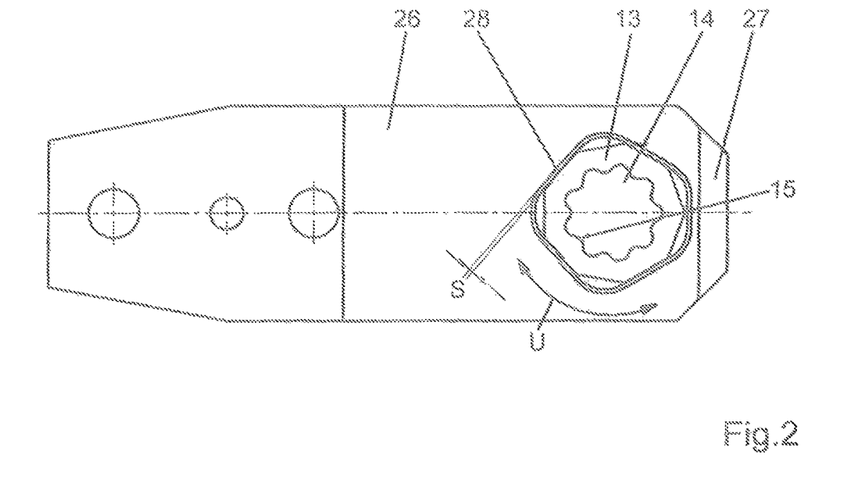
FIG. 2 a plan view of an exemplary embodiment of a transport part of a transporting device of the apparatus of FIG. 1.

In the embodiment, each transport 26 extends radially away from the turn table 25 so at the free end 27 of each transport part 26 is arrange at a minimal distance next to or above the transport surface 24. In doing so, the distance smaller than the thickness of the round blank ring 13. A round blank recess 28 is provided on the tree end 27 in the transport part 26, said recess being disposed for the accommodation of exactly one round blank ring 13. The round blank recess 28 is open toward the transport surface 24 and on the opposite side thereof and thus extends completely through the transport part 26. In the exemplary embodiment shown here, the round blank recess 28 is closed in circumferential direction in the form of a ring. In particular, as shown by FIGS. 1 and 2, the contour and the form of the round blank recess 28 may be adapted to the contour or form of the round blank ring 13. As a result of this, the position of rotation of the round bland ring 13 is essentially specified relative to its circumferential direction U. Due to the non-round outside contour of the round blank ring 13 as in the example and the accordingly adapted non-round contour of the round recess 28, a twisting of the round blank ring inside the round blank recess 28 is possible only within limits. Inasmuch as, however, the feeding and inserting of the round blank ring 13 in the round blank recess 28 at the receiving location 21 most be ensured to occur without jamming and problems, there remains, a play 3 between the outside contour of the round blank ring 13 and the contour of the round blank recess 28, an example of said play being shown at one point in FIG. 2. Due to this play 3 and the of sliding transport of the round blank ring 13 along the transport surface 24 to the insertion location 22, and blank ring might twist inside the round blank recess 28 in circumferential direction U and/or shift in a longitudinal direction L and a transverse direction Q. The longitudinal direction L and the transverse direction Q cover a plane parallel to the transport surface 24 along which the round blank rings 13 are transported. This twisting and/or shifting can result in difficulties when inserting the non-round round blank 11 in the hole 14, said difficulties being eliminated by the present invention as will be described in hereinafter.

As an alternative to the depicted embodiment, the round blank recess 28 may also be open in radially outward direction. In this embodiment, the round blank rings 13 can also be guided on a guide strip or guide body 29 extending along the transport surface 24 in transport direction T, this being illustrated only schematically by a chain line in FIG. 1.

The transport of the round blank rings 13 by the transporting device 20 may take place in a plane that is horizontal or vertical, or in a plane that is inclined as desired.

Next to the insertion location 22 and adjacent to the transport surface 24, there is arranged a feed device 33. The feed device 33 is disposed to position the round blank core 11 at the insertion location 22 on the hole of the round blank ring 13, so that the round blank core 11 can be inserted in the hole 14. To do so, the feed device 33 comprises a feed part 34 that can be moved relative to the latter. For example, the feed part 34 can be moved in a translatory manner between a moved-out position I (FIG. 4) and a retracted position II (FIG. 1). The feed part 34 comprises in a holding section a core recess 35 in which the round blank core 11 is arranged in the retracted position II. The core recess 35 extends completely through the feed part 34, so that the core recess 35 is open on two opposing sides.

Figure 3:
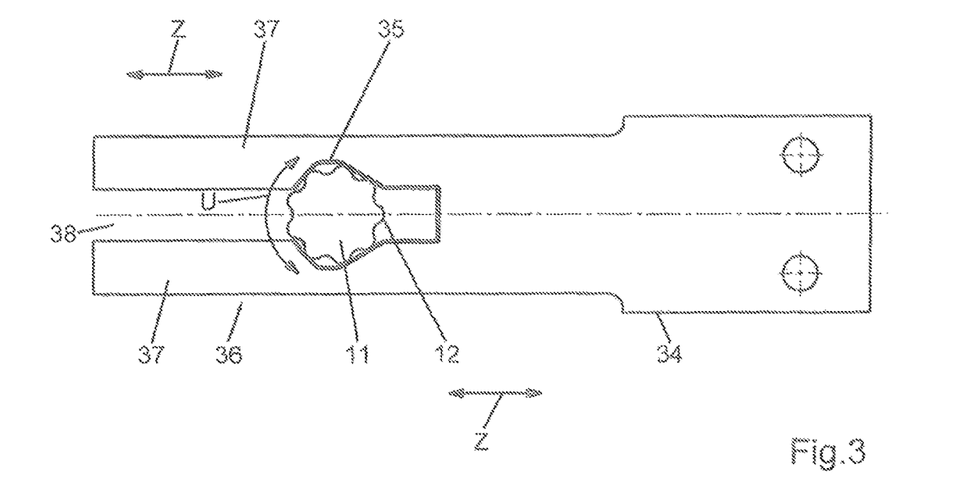
FIG. 3 a plan view of an exemplary embodiment of a feed part of a feed device of the apparatus of FIG. 1.

In accordance with the example, the feed part 34, as well as the transport part 26, are formed by disc-like thin flat parts. Each, the round blank recess 28 or the core recess 35, is open toward the flat sides of the parts 26, 34.

The feed part 34 can be moved in a feed direction Z and in a plane that is oriented parallel to and at a distance from the transport surface 24. In the moved-pout position I of the feed part 34, there is located a transport part 26 of the transporting device 20 between the holding section 36 having the core recess 35 of the feed part 34 and the transport surface 24.

In the exemplary embodiment shown here, the holding section 36 of the feed part 34 has a forked configuration with two tines 37 extending parallel to each other in the feed direction Z. Between the tines 37 there is formed a gap 38 that extends through the core recess 35 or terminates in the core recess 35. In doing so the core recess 35 is configured so as to widen the gap 38, in which case each tine 37 has a recess or a notch widening the gap 38, and thus respectively one section of the core recess 35 is available.

The contour of the core recess 35 need not correspond to the outside contour 12 of the round blank core 11. In the preferred exemplary embodiment the contour of the core recess 35 is selected in such a manner that the round blank core 11 contacts points on the feed part 35, said points being at a distance from each other. Preferably, the contour of the core recess 35 is non-round, so that a twisting of the round blank core 11 in circumferential direction U is avoided or restricted. The core recess 35 may have the contour of an irregular polygon.

Due to the fork-shaped configuration of the feed part 34, the two tines 37 can be elastically moved relative to each other. Then it is possible to hold the round blank core 11 that is to be transported in the core recess 35 with the aid of the two tines 37 in a clamping manner. However, such a clamping action is optional and need not be provided.

Figure 4:
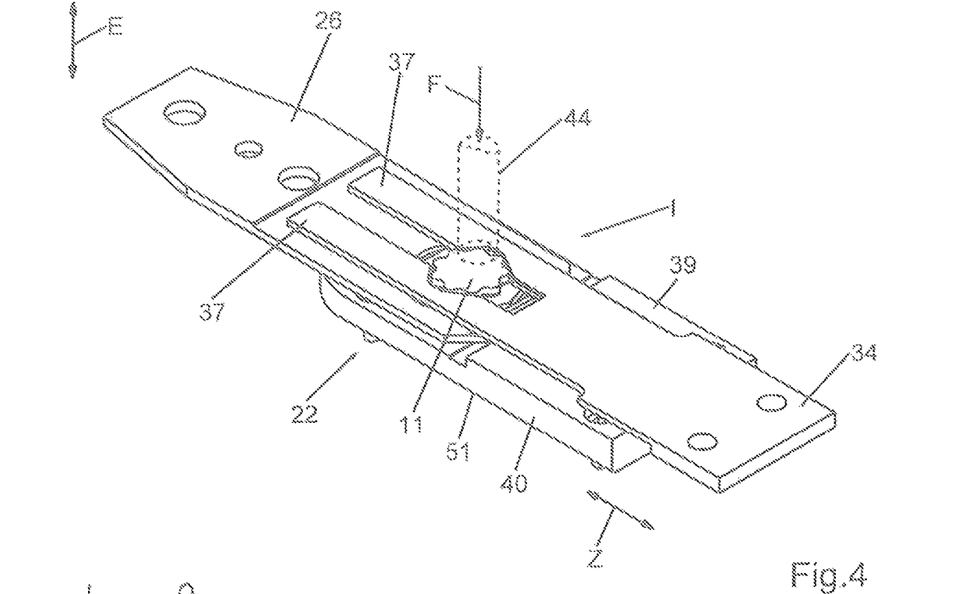
FIG. 4 a perspective representation of the position of the transport part as in FIG. 2 and of the feed part as in FIG. 3, at an insertion location of the apparatus.
Figure 5:
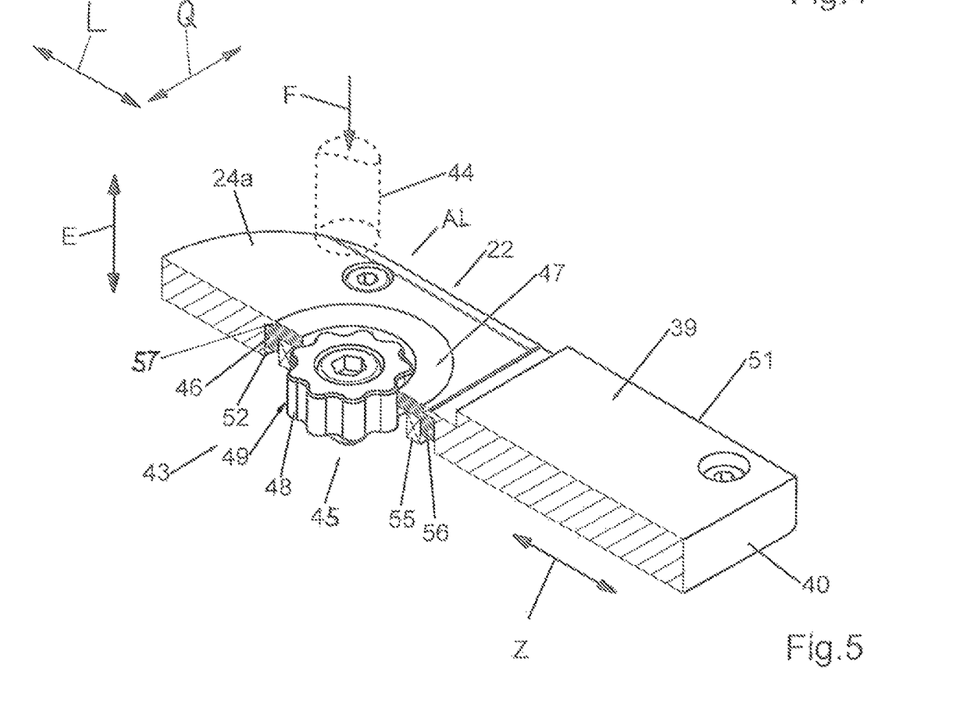
FIG. 5 a perspective representation, partially in section, of an pushing-in device at the insertion location of the apparatus.
Figure 6:
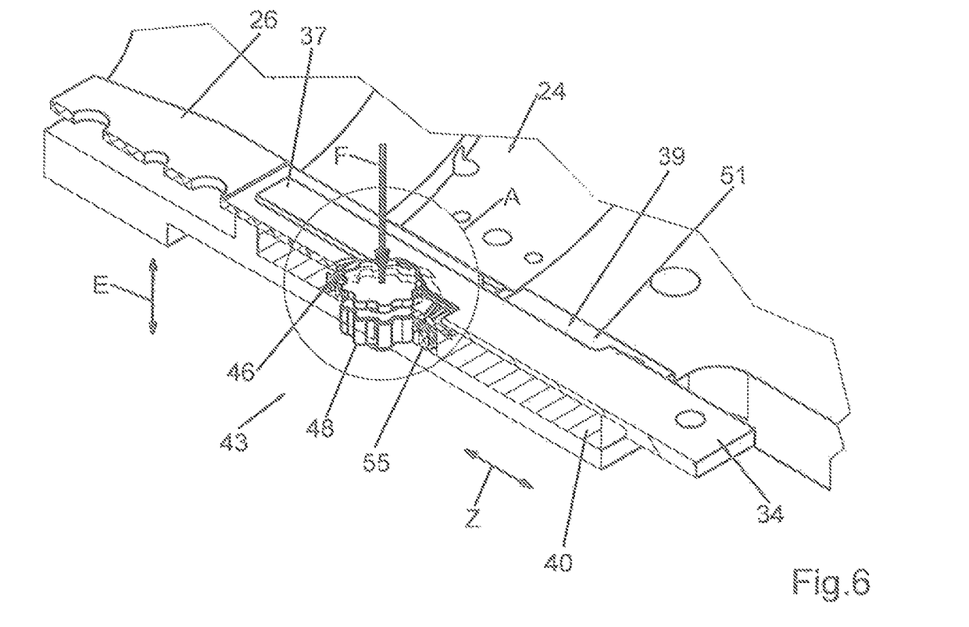
FIG. 6 a perspective representation, partially in section, of the apparatus as in FIG. 1, at the insertion location.
Figure 7:
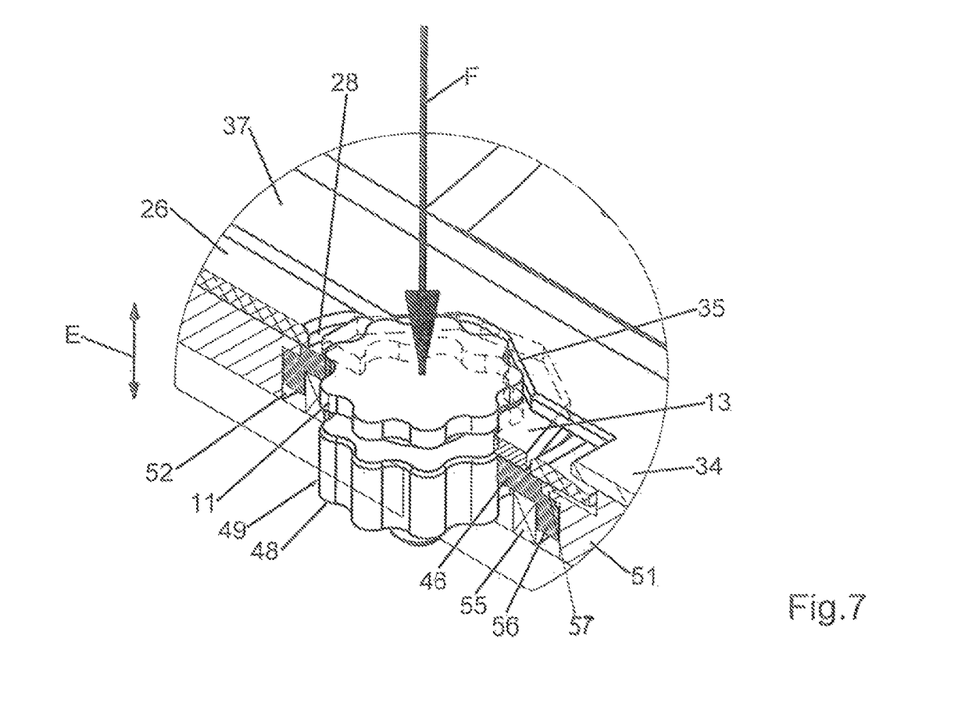
FIG. 7 a perspective representation, partially in section, of the detail A of FIG. 6.
Figure 8A:
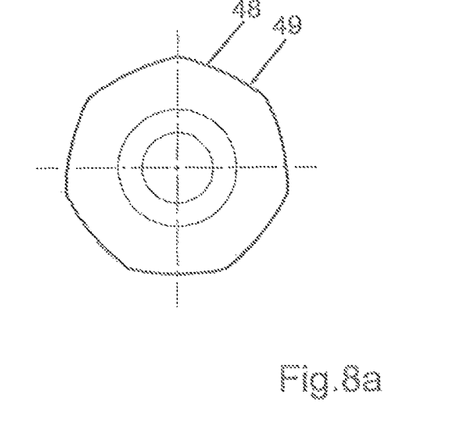
FIGS. 8a to 8e various embodiments of an alignment mandrel of the pushing-in device, in plan view.
Figure 8B:
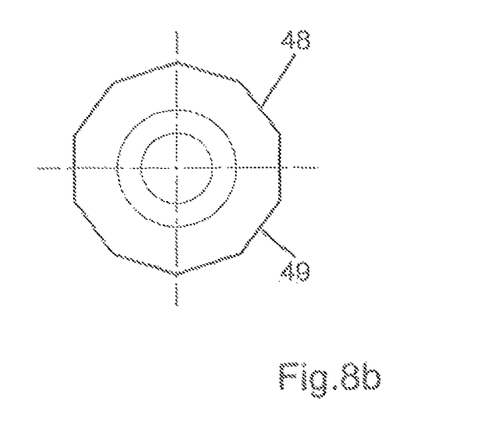
Figure 8C:
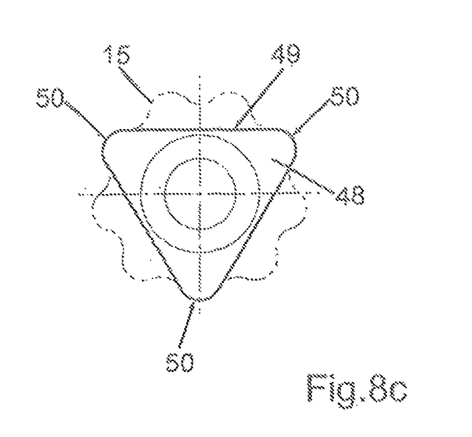
Figure 8D:
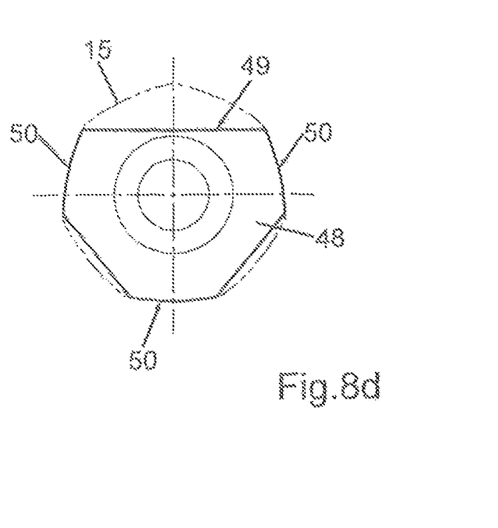
Figure 8E:
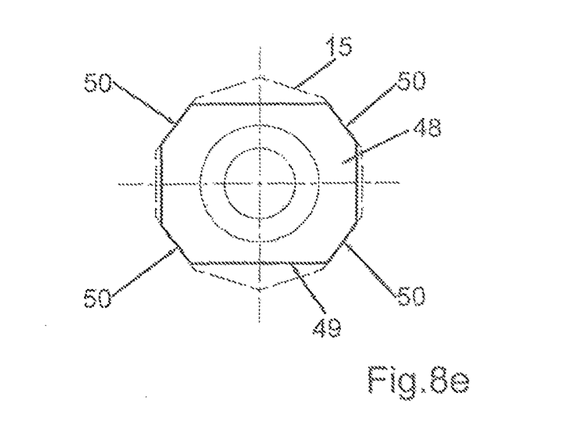

With the aid of the feed device 33 a round blank core 11 is transported to the insertion location 22. In doing so, round blank core 11 can be transported in a sliding manner over a surface 39 of an offset 40 (FIGS. 4, 5 and 6) and beyond this surface 39 of the offset 40 to the insertion location 22. Adjoining the surface 39, the round blank core 11 can be moved in a sliding manner on the round blank ring 13 and/or the transport part 26. In the moved-out position II, the feed device 33 and, consistent with the example, the feed part 34 position the round blank core 11 directly on the hole 14 of the round blank ring 13 arranged on and associated with the the insertion location 22. The round blank core 11 may be in contact with the insertion location 22 on the round blank ring 13. This position is illustrated in FIGS. 4, 6 and 7.

On the insertion location 22 there exists a pushing-in device 43 by means of which the round blank core 11 is inserted or pressed into the round blank ring 13. The pushing-in device 43 comprises a movable pushing-in part 44 that is shown only schematically in FIGS. 4 and 5. The pushing-in part 44 may have the form of a stamp or die and is arranged on the insertion location 22 at a distance opposite the transport surface 24. The pushing-in part 44 can be moved essentially at a right angle with respect to the transport surface 24 in insertion direction E. Said pushing-in part may apply an pushing-in force F to the round blank core 11 in order to move said core out of the core recess 35 into the hole 14 of the round blank ring 13 located at the insertion location 22. FIGS. 6 and 7 show the pushing-in force F only as an arrow to represent the pushing-in part 44. In the exemplary embodiment, the pushing-in part 44 acts directly on the round blank core 11 on the side of the round blank core 11 facing away from the transport surface 24.

The pushing-in device 43 also comprises an alignment means 45 by means of which a relative twisting of the round blank ring 13 in its circumferential direction U can be effected. As a result of this, a corresponding rotation of the round blank ring 13 relative to the round blank core 11 located in the insertion location 22 can take place. This is necessary if the non-round outside contour 12 of the round blank core 11 is not in alignment with or does not match the non-round inside contour 15 of the hole 14, so that an insertion or pushing-in of the round blank core 11 in the round blank ring 13 is not possible in the insertion location 22. During the translatory transport of the round blank core to the insertion location 22, there does not—or only to a non-critical extent—occur a rotation of the round blank core 11 in its circumferential direction. Different therefrom, the sliding transport of the round blank ring 13 to the insertion location 22, according to the example along a circular arc, may allow a twisting of the round blank ring 13 in its circumferential direction U. Due to this twisting, an insertion of the round blank core 11 in the insertion location 22 is no longer possible. Therefore, in accordance with the invention, an alignment means 45 is provided at the insertion location 22.

The alignment means 45 effects a rotation of the round blank ring 13 in its circumferential direction U by applying the pushing-in force F by means of the pushing-in device 43. Furthermore, a lateral shifting of the round blank ring 13 in longitudinal direction L and/or transverse direction Z can be achieved as a result of this.

In the exemplary embodiment described here, the alignment means 45 comprises a support ring 46 with a support surface 47 for the round blank ring 13. If the round blank ring 13 is located in the insertion location 22, said ring is in contact with the support surface 47 or is supported by the support surface 47. In accordance with the example, the support surface 47 is arranged in the same plane as the transport surface 24—at least at the insertion location 22. Furthermore belonging to the alignment means 45, there is a one-part or, alternatively, a multi-part alignment mandrel 48 that is enclosed by the support ring 47. The alignment mandrel 48 has a shell surface 49 that has a non-round outside contour. The outside contour of the shell surface 49 may correspond to the inside contour 15 of the hole 14, as shown in FIGS. 5 to 7. Different therefrom, the alignment mandrel 48 may also have a contour of the shell surface 49 that is different from the inside contour 15. Possible alternative contours of the alignment mandrel 48 are shown in FIGS. 8a to 8e. It is sufficient if three or more spaced-apart contact points 50 exist on the shell surface 49 in circumferential direction, said contact points allowing the position of rotation of the round blank ring 13 in its circumferential direction U to be specified.

The alignment mandrel 48 does not extend through the plane or into the plane in which the transport surface 24 at the insertion location 22 is located. As a result of this, it is ensured that the alignment mandrel 48 does not impair the transport of a round blank ring 13 in and out of the insertion location 22 by the transporting device 20. In particular, the free end of the alignment mandrel 48 is located in or slightly below the plane of the transport surface 24.

The support ring 47 is supported so as to be movable in and counter the pushing-in force F in the insertion direction E. In its non-actuated starting position AL, the support surface 47 is arranged in a plane with the transport surface 24 at the insertion location 22. To do so, the support ring 46 is supported in a bearing part 51 that forms a section 24a of the transport surface 24 at the insertion location 22. This bearing part 51 has a recess 52 that terminates at the section 24a of the transport surface 24. Concentrically seated in this recess 52 are the alignment mandrel 48 and the support ring 47 enclosing the alignment mandrel 48.

In order to hold the support ring 47 in its starting position AL there is provided a pretensioning means 55 that applies a pretensioning force to the support ring 47 in insertion direction E counter the pushing-in force F. The pretensioning means 55 may be elastically deformable elements, springs, for example leaf springs, or similar known elements generating a pretensioning force that can be used individually or in combination. The pretensioning force generated by the pretensioning means 55 and applied to the support ring 47 is smaller than the pushing-in force F generated by the pushing-in device 43. The pretensioning means 55 is arranged in the recess 52.

In accordance with the exemplary embodiment described here, the starting position AL of the support ring 46 is defined by the stop 56 of the support ring 46. In accordance with the example, the stop 56 is an annular flange of the support ring 46. The counter-stop 57, for example, is an annular shoulder that encloses the recess 52 adjoining the termination to the section 24a of the transport surface 24. In the starting position AL, the stop 56 and the counter-stop 57 are in contact with each other. Due to the pretensioning force of the pretensioning means 55, the stop 56 of the support ring 46 is pushed against the counter-stop 57.

The insertion of the round blank core 11 in the round blank ring 15 at the insertion location 22 is performed by the apparatus 10 as explained hereinafter:

Firstly, a round blank ring 13 is moved with the aid of the transporting device 20 to the insertion location 22. In the exemplary embodiment, the round blank ring 13 is in contact with the support surface 47 of the support ring 46. Simultaneously or subsequently, an associate round blank core 11 is positioned on the hole 14 of the round blank ring 13 at the insertion location 22 by means of the feed device 33. Due to a movement of the feed part 34 in feed direction Z, the round blank core 13 is moved to the insertion location 22.

Subsequently, a pushing-in force F is applied to the round blank core 11 via the pushing-in device 43 and, for example, via the pushing-in part 44, so that said round blank core moves at least partially out of the core recess 35. When the round blank core 11 and the round blank ring 13 are correctly aligned in view of their respective circumferential directions U, the round blank core 11 is inserted into the hole 14 of the round blank ring 13.

However, it may happen that the round blank ring 13 has twisted regarding its circumferential direction U during its transport to the insertion location 22. By generating the pushing-in force F, the round blank core 11 is pushed in this case against the round blank ring 13 and cannot be easily inserted in the hole 14. Due to the pushing-in force F, the support ring 46 is moved out of its starting position AL against the pretensioning force of the pretensioning means 55 in insertion direction E. Due to this movement of the support ring 46, the round blank ring 13 is slipped onto the alignment mandrel 48. During this shifting of the round blank ring 13 over the alignment mandrel 48, the inside contour 15 of the hole 14 comes into contact—at the provided contact points 50—with the shell surface 49 of the alignment mandrel 48. Due to these contact points, a specified position of rotation in circumferential direction U of the round blank ring 13 is specified. Due to the contact with the alignment mandrel 48, a twisting and/or lateral shifting of the round blank ring 13 relative to the round blank core 11 is performed until the outside contour 12 of the round blank core 11 matches the inside contour 15 of the hole 14 in the round blank ring 13, and the round blank core 11 is inserted into the hole 14 due to the still effective pushing-in force F.

In the preferred exemplary embodiment, the round blank core 11 is held in place or oriented also during the pushing-in into the round blank ring 13 by the feed part 34 in the core recess 35, so that an inadvertent co-rotation of the round blank core 11 and the round blank ring 13 is prevented.

As soon as the pushing-in force F on the round blank ring 13 decreases, the support ring 46 can be moved again into its starting position AL by the pretensioning means 55, so that the round blank ring 13 and the now inserted round blank core 11 are ultimately back at the level of the transport surface 24.

Following the insertion of the round blank core 11 in the round blank ring 13, the resultant round blank 11, 13 is moved away from the insertion location 22 via the transporting device 20. When the transport part 26 is accelerated, the pushing-in part 44 may remain in its moved-out position with minimal play relative to the round blank core 11 and may thus partially cover the round blank recess 28. Alternatively or additionally, the round blank recess 28 may also be covered by the feed part 34 or its tines 37. As a result of this, it is prevented that the round blank 11, 13 jumps out of the round blank recess 28 at the insertion location 22 during startup.

Subsequently—or simultaneously in accordance with the example—a new round blank ring 13 is transported to the insertion location 22, and the described process begins anew. Also, in accordance with the example, if the transport part 26 is slowed down, the round blank recess 28 at the insertion location 22 is covered by the feed part 34 or its tines 37 when the feed part is in its retracted position II.

Outside the insertion location 22 the round blank recesses 28 may be covered in order to prevent the round blank parts from jumping or falling out of the round blank recesses 28. Depending on the insertion at the receiving location 21 and the removal at the output location 23, the round blank recesses 28 may be open on one or both sides.

Figure 9:
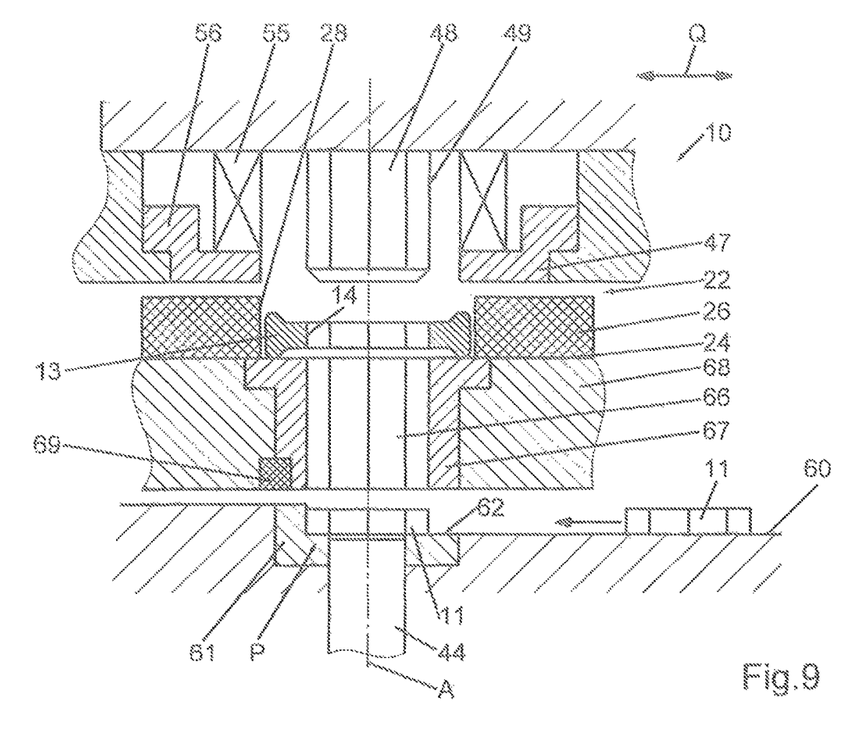
FIG. 9 a schematic cutaway view of an additional exemplary embodiment of an apparatus, in the region of the insertion location.

FIG. 9 shows a modified exemplary embodiment of the device 10. The modification consists of the embodiment of the apparatus 10 at the insertion location 22. Instead of the feed part 34, the feed device 33 has a feed means 60 that is disposed to transport respectively one round blank core 11 into an intermediate position P. In accordance with the example, the intermediate position P is specified by a feed stop 61. The feed means 60 may be, for example, an inclined feed slide along which the round blank cores 11 may slide due to their weight. Alternatively, the feed means 60 may also comprise any other means for transporting the round blank cores 11, for example a transport belt or the like.

Figure 10:
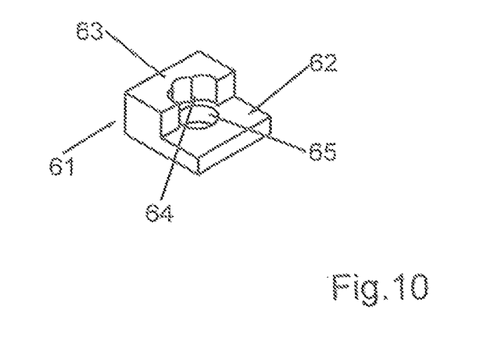
FIG. 10 a perspective view of the stop part of FIG. 9.
Figure 11:
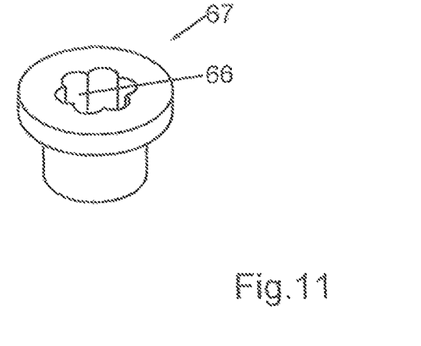
FIG. 11 a perspective representation of the feed channel part of FIG. 9.

FIG. 10 shows a perspective view of the feed stop 61. It has a support surface 62 for a round blank core 11 located in the intermediate position P. The stop surface 64 has a contour that is preferably adapted to the outside contour 12 of the round blank core 11, so that—due to the non-round outside contour 12—a preliminary orientation of the round blank core 11 in circumferential direction and/or a preliminary orientation of the center of the round blank core relative to an axis A may take place.

The feed stop 61 has a through hole 65 that terminates on the bearing surface 62. In the exemplary embodiment, the through hole 65 is cylindrical. The through hole 65 is disposed to allow the pushing-in part 44 to move through the through hole 65 in contact with the round blank core 11 that is in the intermediate position P.

At the insertion location 22, the transport part 26 is arranged at or on a transport palette 68 through which completely extends a feed channel 66 that terminates at the insertion location 22 on the transport surface 24. In the exemplary embodiment shown in FIG. 9, the feed channel 66 is provided in a tubular part 67. The tubular part 67 can be arranged in the transport palette 68 secured against rotation by an anti-twist device 69. The cross-section of the feed channel 66 may correspond to the outside contour of the round blank core 11 or be adapted to the outside contour 12 in such a manner that the feed channel 66 specifies a specified position of rotation of the round blank core 11 in circumferential direction about its center axis, as well as specifies a centering of the round blank center relative to the axis A. To accomplish this, it is sufficient to define three or more contact points distributed in circumferential direction, analogous to the embodiment of the alignment mandrel 48, relative to the inside contour 15 of the hole 14, as has been described in conjunction with FIGS. 8a to 8d.

The alignment mandrel 48, the support ring 47, the pretensioning means 55 and the stop 56 are arranged opposite the feed channel 66 at the insertion location 22, so that the round blank ring 13 is located between the alignment mandrel 48 and the feed channel 66. The alignment mandrel 48 and the feed channel 66 are arranged so as to be aligned along a common axis A. The pushing-in part 44 and the through hole 65 are also arranged so as to be in alignment along this axis A.

The apparatus in accordance with FIG. 9 is disposed for inserting a round blank core 11 in a round blank ring 13 at the insertion location 22 as follows:

A round blank core 11 is brought into the intermediate position P by the feed means 60. Subsequently, the pushing-in part 44 is moved along the axis A and, in doing so, transports the round blank core 11 out of the intermediate position P through the feed channel 66 to the round blank ring 13. When the alignment between the round blank ring 13 and the round blank core 11 is correct, said core can be pushed in or inserted by means of the pushing-in part 44. Otherwise, a relative rotation and/or a relative shifting of the round blank ring 13 occurs with respect to the round blank core 11 until they are in correct relative arrangement and orientation with respect to each other, and insertion may take place. Other than that, the apparatus 10 according to FIG. 9 works in the manner as described previously in conjunction with the other exemplary embodiments. In the exemplary embodiment according to FIG. 9 the insertion of the round blank core 11 in the round blank ring 13 may be accomplished, for example, vertically upward or in a direction of movement with a vertically-upward directed component. Alternatively, it is also possible to orient the axis A horizontally or at any angle relative to the horizontal.

The invention relates to an apparatus 10 and a method for inserting a non-round round blank core 11 into a non-round hole 14 of a round blank ring 13. The resulting round blank 11, 13 is then transported onwards to an embossing press. A transporting device 20 serves for transporting the round blank ring 13 to an insertion location 22. A feed device 33 serves for transporting the round blank core 11 to the insertion location 22. The round blank core 11 is positioned here on the hole 14 of the round blank ring 13. The round blank core 11 is inserted into the hole 14 with the aid of a pushing-in device 43, which subjects the round blank core 11 to a pushing-in force F. If the non-round hole 14 is not in alignment with the non-round round blank core 11, the round blank core 11 and the round blank ring 13 are made to rotate relative to one another at the insertion location by virtue of the pushing-in force F being generated. The round blank ring 13 is preferably moved, by the pushing-in force F, onto an alignment mandrel 48, which causes the round blank ring 13 to rotate in its circumferential direction U until the contours of the round blank core 11 and of the hole 14 are in alignment and the round blank core 11 is moved into the hole 14.

LIST OF REFERENCE SIGNS

10 Apparatus
11 Round blank core
12 Outside contour of the round blank core
13 Round blank ring
14 Hole
15 Inside contour of the hole
20 Transporting device
21 Receiving location
22 Insertion location
23 Output location
24 Transport surface
24a Section of the transport surface
Turn table
25 Transport part
26 Free end
27 Round blank recess
28 Guide body
29 Feed device
33 Feed part
34 Core recess
35 Holding section
36 Tines
38 Gap
39 Surface
40 Offset
43 Pushing-in device
44 Pushing-in part
45 Alignment means
46 Support ring
47 Support surface
48 Alignment mandrel
49 Shell surface
50 Contact point
51 Bearing part
52 Recess
55 Pretensioning means
56 Stop
57 Counter-stop
60 Feed means
61 Feed stop
62 Bearing surface
63 Projection
64 Stop surface
65 Through hole
66 Feed channel
67 Tubular part
68 Transport palette
69 Anti-twist device
I Moved-out position of the feed part
II Retracted position of the feed part
α Angle of rotation
A Axis
AL Starting position
E Insertion direction
F Pushing-in force
L Longitudinal direction
P Intermediate position
Q Transverse position
U Circumferential direction
Z Feed direction

The invention claimed is:

1. Apparatus (10) for inserting a round blank core (11) with a non-round outside contour (12) in a round blank ring (13) having a hole (14) with an inside contour (15) adapted to the non-round outside contour (12) of the round blank core (11), the apparatus comprising:
a transporting device (20) configured to transport the round blank ring (13) to an insertion location (22), a feed device (33) configured to position a round blank core (11) at the insertion location (22) on the hole (14) of the round blank ring (13), a pushing-in device (43) that comprises a movable pushing-in part (44) configured to apply a pushing-in force (F) to the round blank core (11) positioned by the feed device (33) at the insertion location (22), said force acting toward the round blank ring (13), wherein the pushing-in device (43) has, at the insertion location (22), an alignment device (45) configured to rotate the round blank ring (13) relative to the round blank core (11).

2. Apparatus as in claim 1,
wherein the alignment device (45) comprises:
a support ring (46) with a support surface (47) for the round blank ring (13), and
an alignment mandrel (48) with a non-round contour,
wherein the support ring (46) can be moved relative to the alignment mandrel (48) due to the pushing-in force (F) of the pushing-in part (44).

3. Apparatus as in claim 2,
wherein the support ring (46) is pretensioned via a pretensioning means (55) in an non-actuated starting position (AL).

4. Apparatus as in claim 2,
wherein the alignment mandrel (48) has, on its shell surface (49), at least three contact points (50) spaced apart in circumferential direction (U), said contact points being provided for contact of the hole (14) of the round blank ring (13) on the inside contour (15) of the hole (14).

5. Apparatus as in claim 2,
wherein the transporting device (20) has a transport surface (24) configured to provide sliding transport of the round blank ring (13) to the insertion location (22), and
wherein the support surface (47) of the support ring (46) in its starting position (AL) and the transport surface (24) at the insertion location (22) are arranged in a common plane.

6. Apparatus as in claim 1, wherein the transporting device (20) has a transport surface (24) configured to provide sliding transport of the round blank ring (13) to the insertion location (22).

7. Apparatus as in claim 6,
wherein the transporting device (20) comprises a transport part (26) that can be moved relative to the transport surface (24), said transport part having a round blank recess (28) configured to receive the round blank ring (13), said recess being open toward the transport surface (24) and on the side opposite the transport surface (24).

8. Apparatus as in claim 1, wherein the feed device (33) comprises a movable feed part (34) that has a core recess (35) configured to receive the round blank core (11).

9. Apparatus as in claim 8,
wherein the feed part (34) can be moved in a translatory manner in a feed direction (Z) that is oriented transversely with respect to a transport direction of the transporting device (20).

10. Apparatus as in claim 1,
wherein the feed device (33) comprises a feed means (60) that transports the round blank core (11) to the pushing-in part (44) whose movement further transports the round blank core (11) to the round blank ring (13) and, subsequently, applies the pushing-in force (F) against the round blank ring (13).

11. Method for inserting a round blank core (11) with a non-round outside contour (12) into a round blank ring (13) that has a hole (14) with an inside contour (15) adapted to the non-round outside contour (15) of the round blank core (11), the method comprising:

transporting the round blank ring (13) to the insertion location (22) of a transporting device (20), positioning the round blank core (11) at the insertion location (22) on the hole (14) of the round blank ring (13) by a feed device (33), applying a pushing-in force (F) to the round blank core (11) positioned at the insertion location (22) toward the round blank ring (13) by a movable pushing-in part (44) of a pushing-in device (43), twisting the round blank ring (13) relative to the round blank core (11) by an alignment device (45) when the round blank core (11) is in contact with the round blank ring (13) with the pushing-in force (F) present.

12. Method as in claim 11,
wherein the twisting of the round blank ring (13) is accomplished in that a support ring (46) with a support surface (47) for the round blank ring (13) provided on the insertion location (22) is shifted together with the round blank ring (13) by the pushing-in force (F) via an alignment mandrel (48) having a non-round cross-section, and that the round blank ring (13) is rotated in its circumferential direction (U) due to contact with the alignment mandrel (48).

13. Method as in claim 11,
wherein a round blank including the round blank ring (13) and the inserted round blank core (11) is transported to an output location (23) and is output there directly to an embossing press or to an additional transport unit.

* * * * *